United States Patent
Anderson et al.

(10) Patent No.: US 10,807,469 B2
(45) Date of Patent: Oct. 20, 2020

(54) MOTOR VEHICLE DRIVE ARRANGEMENT

(71) Applicant: ARBOC Specialty Vehicles, LLC, Middlebury, IN (US)

(72) Inventors: Joshua J. Anderson, Charlotte, NC (US); Donald W. Roberts, Franklin, NC (US); Thomas A. Kuhl, Davenport, FL (US)

(73) Assignee: ARBOC Specialty Vehicles, LLC, Middlebury, IN (US)

( * ) Notice: Subject to any disclaimer, the term of this patent is extended or adjusted under 35 U.S.C. 154(b) by 0 days.

(21) Appl. No.: 16/157,449

(22) Filed: Oct. 11, 2018

(65) Prior Publication Data

US 2020/0070652 A1     Mar. 5, 2020

Related U.S. Application Data

(60) Provisional application No. 62/724,795, filed on Aug. 30, 2018.

(51) Int. Cl.
| | |
|---|---|
| *B60K 17/00* | (2006.01) |
| *B60K 17/22* | (2006.01) |
| *F16H 1/14* | (2006.01) |
| *B60K 17/04* | (2006.01) |

(52) U.S. Cl.
CPC ............ *B60K 17/22* (2013.01); *B60K 17/04* (2013.01); *F16H 1/14* (2013.01); *B60Y 2200/143* (2013.01)

(58) Field of Classification Search
CPC . B60K 17/24; B60K 5/04; B60K 5/06; B60K 5/12
See application file for complete search history.

(56) References Cited

U.S. PATENT DOCUMENTS

| | | | |
|---|---|---|---|
| 1,993,912 A | 3/1935 | Austin | |
| 2,001,029 A * | 5/1935 | Kulick | B60K 5/12 180/56 |
| 2,037,464 A * | 4/1936 | Flogaus | B60K 5/04 180/292 |
| 2,096,541 A * | 10/1937 | Haltenberger | B60K 5/04 180/292 |

(Continued)

FOREIGN PATENT DOCUMENTS

| | | |
|---|---|---|
| EP | 0395586 A1 | 10/1990 |
| WO | 1986006688 A1 | 11/1986 |

*Primary Examiner* — Hau V Phan
(74) *Attorney, Agent, or Firm* — Perry + Currier Inc.; Matthew J. Marquardt

(57) ABSTRACT

A drive arrangement for a motor vehicle, such as a bus, using a rear driven axle and having a propulsion unit positioned so that it is not aligned with the direction of travel of the vehicle. The propulsion unit is oriented at an acute angle to the base reference axis of the vehicle. The axle is provided with a driven input shaft that is oriented at an angle not parallel to the direction of travel of the vehicle. The propulsion unit comprises a motor, a transmission, and a bevel gear box coupled to the transmission, with an output shaft that is oriented at an angle not parallel to the axis of the propulsion system. The propulsion unit output shaft and the driven axle input shaft are not aligned coaxially, and are connected via a propeller shaft, wherein the ends of the propeller shaft use constant velocity joints to accomplish a change in the angle of the transmitted power and torque.

16 Claims, 5 Drawing Sheets

(56) References Cited

U.S. PATENT DOCUMENTS

| | | | |
|---|---|---|---|
| 2,195,509 A * | 4/1940 | Buckendale | B60K 17/04 |
| | | | 180/292 |
| 2,202,810 A * | 6/1940 | Blanc | B62D 37/04 |
| | | | 180/21 |
| 2,238,616 A * | 4/1941 | Wolf | B60K 5/04 |
| | | | 180/54.1 |
| 2,435,930 A * | 2/1948 | Schjolin | B60K 5/04 |
| | | | 180/297 |
| 2,785,763 A | 3/1957 | Stump | |
| 3,399,743 A * | 9/1968 | Hetmann | B60K 5/04 |
| | | | 180/55 |
| 3,563,328 A | 2/1971 | Ahola et al. | |
| 4,283,966 A * | 8/1981 | Hagin | B60K 6/105 |
| | | | 180/297 |
| 4,362,221 A | 12/1982 | Manning | |
| 4,530,415 A * | 7/1985 | Sakata | B60K 5/04 |
| | | | 180/256 |
| 4,534,442 A * | 8/1985 | Botar | B60K 5/06 |
| | | | 180/294 |
| 4,535,867 A | 8/1985 | Botar | |
| 5,463,915 A | 11/1995 | Fuehrer et al. | |
| 6,810,770 B1 * | 11/2004 | Korner | F16H 1/14 |
| | | | 475/230 |
| 7,252,616 B2 | 8/2007 | Wormsbaecher | |
| 7,318,495 B2 | 1/2008 | Pregel | |
| 8,074,532 B2 | 12/2011 | Zirkl | |
| 9,776,495 B2 * | 10/2017 | Wojno | B60K 5/1283 |
| 2008/0021620 A1 * | 1/2008 | Johansson | B60K 17/24 |
| | | | 701/49 |

\* cited by examiner

MOTOR VEHICLE DRIVE ARRANGEMENT

CROSS-REFERENCE TO RELATED APPLICATIONS

This application claims all right and benefit of U.S. provisional application Ser. No. 62/724,795, filed Aug. 30, 2018, the entire contents of which are herein incorporated by reference.

TECHNICAL FIELD

Embodiments of the invention(s) described herein relate generally to an arrangement for the drive train of a vehicle, such as a bus, with the rear axle driven.

BACKGROUND

Buses and other heavy duty vehicles are commonly constructed using a large engine, transmission, and driven axle joined in a drive train assembly capable of providing motive power to move the vehicle. Propulsion units for such vehicles generally comprise an engine coupled to a manual or automatically shifted transmission having selectable gear sets that provide for the application of different gear ratios. A propeller shaft (also sometimes referred to as a drive shaft) may be employed to join the output shaft of the propulsion unit to the input shaft of a differential gear assembled as part of a driven axle assembly that incorporates the rear axle and wheels. In certain types of buses and heavy duty vehicles, the propulsion unit is mounted at the rear of the vehicle usually in order to maximize the usable space of the vehicle passenger cabin. Rear mounted drive train assemblies may in some cases be arranged in either a T-drive or an angled V-drive configuration as well as variations on these two types of arrangements.

A T-drive configuration arranges the propulsion unit behind the rear axle, with its axis generally aligned to the longitudinal axis of the vehicle, and with the output shaft of the propulsion unit oriented effectively in parallel to the corresponding input shaft at the axle differential. A propeller shaft is used to join the propulsion unit output shaft and corresponding axle input shaft and typically employs universal joints at either end of the propeller shaft to allow for some degree of misalignment and for movement of the axle assembly relative to the propulsion unit. The propeller shaft has a length that will accommodate some angular deflection of the driveshaft, typically maintaining less than 3 degrees of angular deflection at each joint. Deflections beyond this amount may result in accelerated wear of the joint or introduction of unwanted vibration to passenger cabin or other areas of the vehicle.

One drawback of T-drive configurations is the extension of the vehicle behind the rear axle that results from accommodating the full length of the propulsion unit in the longitudinal direction, as well as satisfying minimum length requirements or specifications of the propeller shaft. Such vehicle extension may be 3 meters or more from the rear axle in some cases. This additional length can help to minimize deflection or offsets between the propulsion unit output shaft and the input shaft on the differential gear, but can also tend to decrease maneuverability of the vehicle around turns, due to the long extension at the rear.

Vehicles based around a T-drive configuration also have a tendency for an inferior ride quality as the shorter wheelbase between front and rear axles shifts the center of mass of the vehicle farther rearward of the center of the wheelbase, resulting in less of the mass being shared by the front steer axle. The shorter wheelbase may also contribute to an inefficient use of the vehicle interior compartment, by reducing the flat floor between axles and causing more of the passenger area to reside on a raised platform above the power train assembly that is inaccessible without steps or climbing.

Unlike the T-drive configuration, a V-drive configuration typically arranges the propulsion unit behind the rear axle with its axis aligned orthogonally (i.e. transverse) to the longitudinal axis of the vehicle. This arrangement places the rotational axis of the propulsion unit in parallel with the rotational axis of the rear axle assembly. An angled drive gear is incorporated at the end of the transmission and is used to translate the propulsion unit output to a propeller shaft arranged at an angle (i.e. diagonal) to the longitudinal axis of the vehicle and connected to a corresponding angled input to the axle differential. The axis of the output shaft of the angled drive gear and the axis of the input shaft of the axle differential are each oriented diagonally to the longitudinal axis of the vehicle, effectively in parallel to one another, which again limits the resultant angles of the propeller shaft universal joints.

SUMMARY

In at least one broad aspect, there is provided a drive train assembly for a motor vehicle having a rear driven axle and a propulsion unit positioned rearward of the rear driven axle. The drive train assembly may include a transmission aligned with an axis along which the propulsion unit is oriented and an angled bevel gear box coupled to the transmission. The angled bevel gear box has an output shaft aligned with an output shaft axis that is offset from each of a longitudinal axis of the vehicle and the axis of the propulsion unit, and the axis of the propulsion unit is oriented so that it is not aligned with the longitudinal axis of the vehicle and forms a first angle with a plane defined by transverse and vertical axes of the vehicle.

In at least one other broad aspect, there is provided a motor vehicle with front and rear axles, a propulsion unit positioned rearward of the rear axle, and a drive train assembly coupled to the propulsion unit and to the rear axle. The drive train assembly may include a transmission aligned with an axis along which the propulsion unit is oriented and an angled bevel gear box coupled to the transmission. The angled bevel gear box has an output shaft aligned with an output shaft axis that is offset from each of a longitudinal axis of the vehicle and the axis of the propulsion unit, and the axis of the propulsion unit is oriented so that it is not aligned with the longitudinal axis of the vehicle and forms a first angle with a plane defined by transverse and vertical axes of the vehicle.

In some embodiments, the first angle is between 5 and 15 degrees.

In some embodiments, the axis of the propulsion unit is oriented so as to form a second angle with a plane defined by the longitudinal and transverse axes of the vehicle.

In some embodiments, the second angle is between 3 and 7 degrees.

In some embodiments, the output shaft of the angled bevel gear box and an input shaft of the rear driven axle are connected via a propeller shaft.

In some embodiments, the output shaft of the angled bevel gear box and the input shaft of the rear driven axle are not parallel.

In some embodiments, the output shaft of the angled bevel gear box and the input shaft of the rear driven axle are aligned on respective axes that do not intersect.

In some embodiments, the propeller shaft at each end includes a constant velocity joint configured to change the angle of torque transmitted from the angled bevel gear box to the rear driven axle.

In some embodiments, the respective angles of the constant velocity joins are equal.

In some embodiments, each constant velocity joint provides up to 8 degrees of angular deviation.

Further details of these and other aspects of the described embodiments will be apparent from the detailed description to follow below.

BRIEF DESCRIPTION OF THE DRAWINGS

In the following description, reference is made to the accompanying drawings, in which.

For clarity and ease of description, like reference numerals will be used in the drawings to denote like parts of the described embodiments.

DETAILED DESCRIPTION

Figure 1:
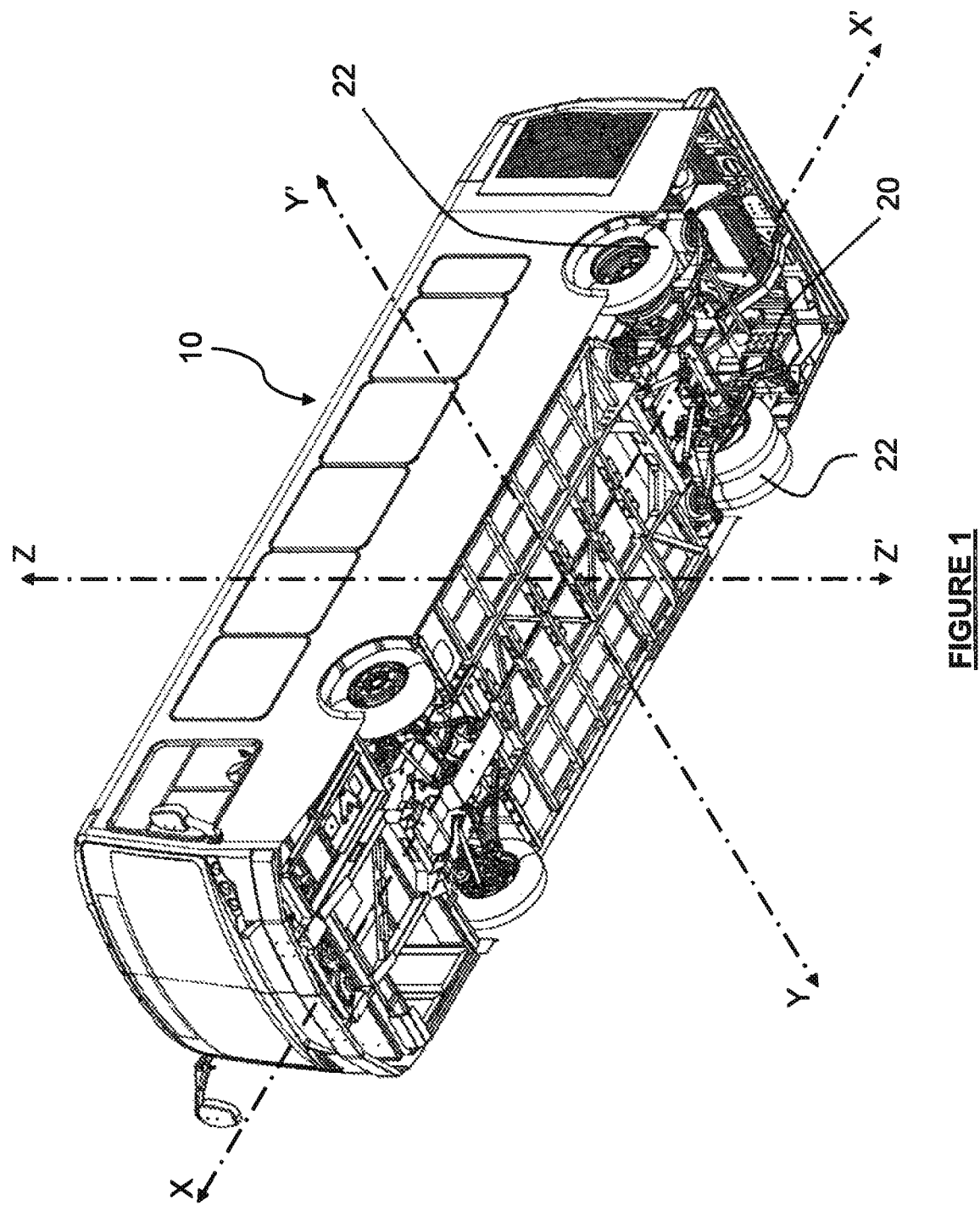
FIG. 1 is an orthographic view of a vehicle embodying features of the invention(s) described herein.

Compared to a typical T-drive, a V-drive configuration may beneficially reduce the overall size of the power train in at least the longitudinal direction of the vehicle. For vehicles in which the propulsion unit is housed aft of the rear axle, the relative compactness of the V-drive configuration in this dimension generally allows for the rear axle to be placed closer to the rear of the vehicle, which can reduce vehicle overhang. This may then improve maneuverability, ride quality, center of mass position, and flat floor space of the passenger area.

However, a V-drive configuration can also be subject to one or more practical limitations. For example, increases in the size and axial length of engines and transmissions have made transverse orientation of the propulsion unit difficult to accommodate within the allowable vehicle width because, while the size of the engine and transmission may increase, the maximum allowable width of the bus may be subject to constraint. For the diagonal propeller shaft to have clearance with other components and to maintain appropriate operating angles, the propulsion unit increasingly is located farther away from the rear axle. This extra length may work to counteract the various benefits of the V-drive configuration related to vehicle rear overhang. Further, where driven accessories on the engine, such as alternators or compressors, are arranged radially around the engine axis in the V-drive configuration, overall length of the vehicle may be increased beyond what would accommodate the drive train assembly only.

Embodiments of the invention provide a drive train assembly for a motor vehicle, such as a bus or other heavy duty vehicle, which operates using a rear driven axle in which the vehicle propulsion unit is positioned behind the driven axle. The propulsion unit comprises a motor, a transmission, and an angled bevel gear box coupled to the transmission, with an output shaft that is oriented at an angle not parallel to the axis of the propulsion system in accordance with a configuration of an angle drive system. The propulsion unit is oriented within the drive train assembly so that its axis of alignment forms an angle with the transverse axis of the vehicle and to the horizontal plane defined by the vehicle transverse and longitudinal axes. The propulsion unit output shaft and the driven axle input shaft are not aligned coaxially and are coupled together by a propeller shaft. Connection with the propeller shaft is achieved, for example, using constant velocity joints that provide for a relatively large change in the angle of the transmitted torque from the propulsion unit to the driven axle.

This configuration of an angled drive train assembly can be advantageous for a number of reasons depending on the application. First, angling of the propulsion unit so as to be offset from the vehicle transverse axis and horizontal plane may realize a relatively compact grouping of components at the rear of a motor vehicle by shrinking the size of the drive train assembly in three-space. This in turn can reduce the amount of vehicle overhang aft of the rear axle and thereby provide sufficient departure clearance, increase maneuverability in turns, and/or increase the relative dimension between front and rear axles. In addition, the total number of components included in the drive train assembly may be reduced or minimized, in order to maintain efficiency of power transmission, reduce service, maintenance and potential failure points, reduce overall mass of the system, and/or reduce costs.

Referring initially to FIG. 1, a vehicle 10 with a driven axle 20 including driven wheels 22 is depicted in an orthographic view. The vehicle 10 can be a bus or other form of mass transit or heavy duty vehicle that has a generally elongated body aligned with a longitudinal axis X-X'. As shown, axis line X-X' is centrally disposed in a longitudinal direction of vehicle 10 with a forward vehicle direction X and a reverse vehicle direction X', A transverse axis Y-Y' of vehicle 10 is also shown in FIG. 1 with right side vehicle direction Y and a corresponding left side vehicle direction Y'. Likewise a vertical axis Z-Z' of vehicle 10 can indicate an upwards vehicle direction Z as well as a downwards vehicle direction Z. Taken together, the axes also define a corresponding number of reference planes that may be used for convenience to describe features of the invention(s) herein. These may include a horizontal reference plane XY defined by longitudinal axis X-X' and transverse axis Y-Y', a vertical reference plane XZ defined by longitudinal axis X-X' and vertical axis Z-Z' form, and a vertical reference plane YZ defined by transverse axis Y-Y' and vertical axis Z-Z'.

Although not specifically indicated in FIG. 1, vehicle 10 may further comprise additional structural components that are typical of transport vehicles such as chassis, frames, support members, interconnections, side, top, and bottom walls, and the like. The depiction of vehicle 10 in FIG. 1 shows a generally elongated structure. As will be appreciated, however, additional shapes and dimensionalities of vehicle 10 may be possible without departing from the scope of the described embodiments.

As described further below, vehicle 10 may further include a drive train assembly coupled to a power unit that are together used for propulsion of the vehicle 10. The drive train assembly and power unit may be housed within vehicle 10 so as to supply motive force to the rear axle 20 of vehicle 10, although in some cases it may be that the front axle and not the rear axle 20 of vehicle 10 is coupled to the power unit. Further as described below, the drive train assembly and power unit may be coupled to the rear axle 20 aft of the rear axle, although this may be varied in other embodiments.

Figure 2:
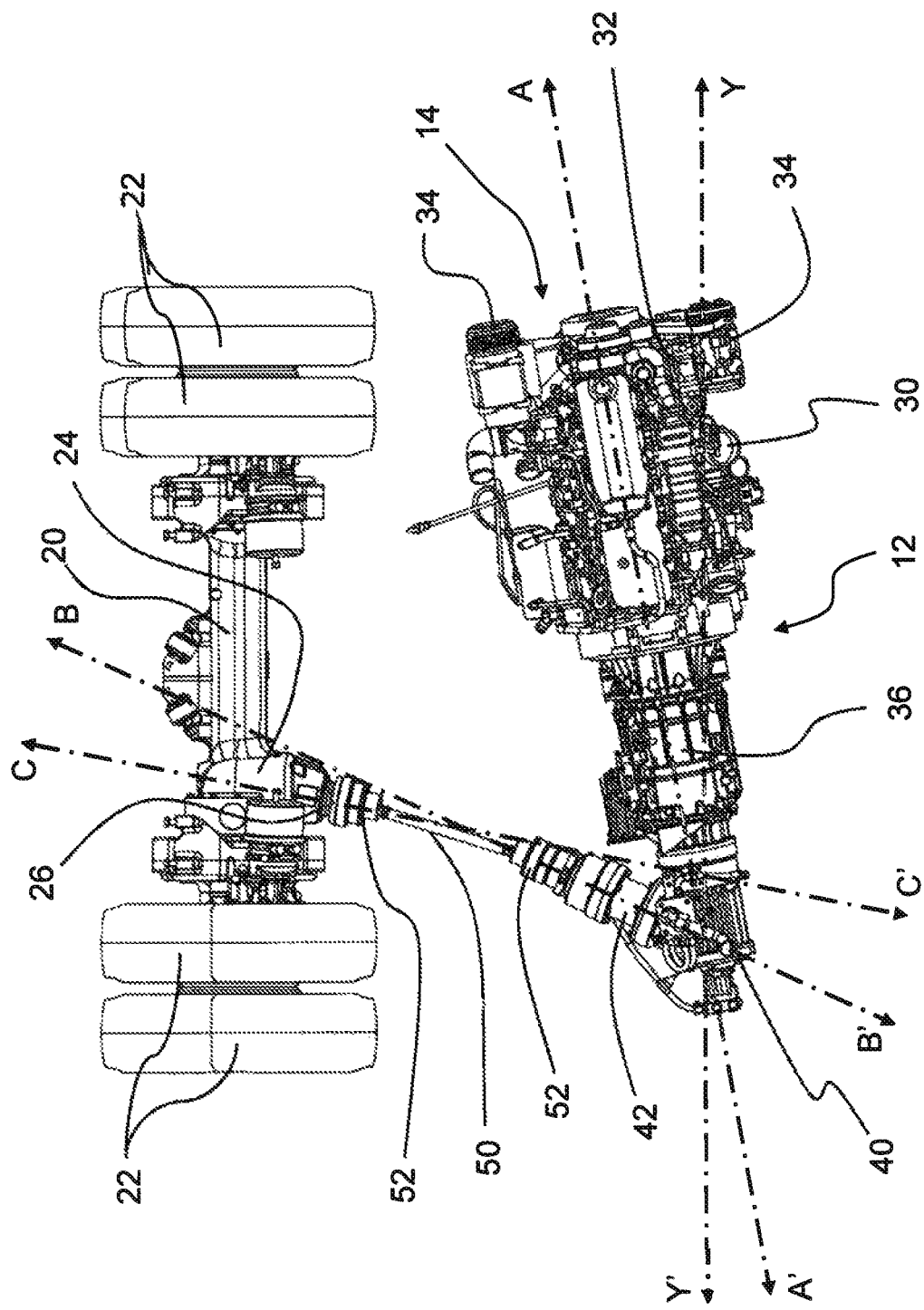
FIG. 2 is a top plan view of a drive train assembly in accordance with the described embodiments.

Referring now to FIG. 2, there is shown a plan view of a drive train assembly 12 that may be included in embodiments of vehicle 10. Drive train assembly 12 is shown in FIG. 2 from a perspective that is orthogonal to the plane XY, i.e., a top down view in which reference plane XY is parallel to the page. Drive train assembly 12 may be incorporated into a vehicle 10 and can include a power unit 14 coupled to a mechanical transmission 36 that incorporates selectable gear sets that may be either manually or automatically shifted depending on the configuration of vehicle 10. In different embodiments, depending on the application, power unit 14 may comprise a diesel engine, internal combustion engine, or other motive power source 30 that incorporates a drive belt 32 on the end opposite to the transmission 36. Drive belt 32 can be used operably to power one or more accessory devices 34, which may include an alternator, compressor, or other rotary driven accessories.

In accordance with embodiments of the invention, power unit 14 may be coaxially aligned with an output shaft of the transmission 36 along a common reference axis A-A'. Transmission 36 may be coupled to an angle gearbox 40 containing, for example, a bevel or spiral bevel gear set that is used to change the direction of the power and torque supplied by the propulsion unit 14. Angle gearbox 40 may therefore have an output shaft 42 generally oriented in line with a reference axis B-B', which is generally not aligned with propulsion unit axis A-A' and forms an angle ab therewith.

A propeller shaft 50 may be employed to operably couple angle gearbox 40 to the driven axle 20 and thus serve to transmit power and torque generated by the propulsion unit 14 to the driven axle 20. An output shaft 42 of angle gearbox 40 is mechanically coupled to an interconnection attached to the propeller shaft 50. In some cases, the interconnection can be a constant velocity joint 52. The other end of propeller shaft 50 may also include an interconnection, which can also be a constant velocity joint 52, mechanically coupled to a differential gear 24 of the driven axle 20 by way of an input shaft 26. In some cases, the driven axle 20 can have a portal axle design supplied with an offset, angled differential gear.

Additional elements for mounting, interconnecting, or otherwise supporting the drive train assembly 12 within vehicle 10 are not shown in FIG. 2 for clarity and convenience so as not to obscure other features of the embodiments.

As seen in FIG. 2, this configuration of a drive train assembly 12 has a compact layout in one or more dimensionalities. The propulsion unit axis A-A' is not parallel to the transverse vehicle plane YZ (also the vehicle transverse axis Y-Y'), but rather is disposed at an angle thereto so that angle gearbox 40 is a greater distance from the driven axle 20 than is the engine 30. This orientation allows the propulsion unit 14 to be of greater overall length within the width of the vehicle 10 than if propulsion unit 14 was oriented in parallel with the transverse plane YZ. An additional advantage is that the accessory components 34 on drive belt 32 can be shifted forward and thereby have a reduced protrusion to the rear of drive train assembly 12, allowing for a reduction in the rear overhang of the vehicle 10. A still further advantage is that by pushing angle bevel gear box 40 rearward, the length of propeller shaft 50 may be maximized within a given overhang of vehicle 10. As noted, increases in the length of propeller shaft 50 can advantageously reduce angular offset.

The angular offset between plane YZ (or vehicle transverse axis Y-Y') and propulsion unit axis A-A' can be varied in different embodiments. In some cases, the angular offset may be any angle between 5 or 15 degrees, without departing from the scope of the described embodiments. For example, in some cases the angle can be 10 degrees approximately although other angles may be possible as well.

Figure 3:
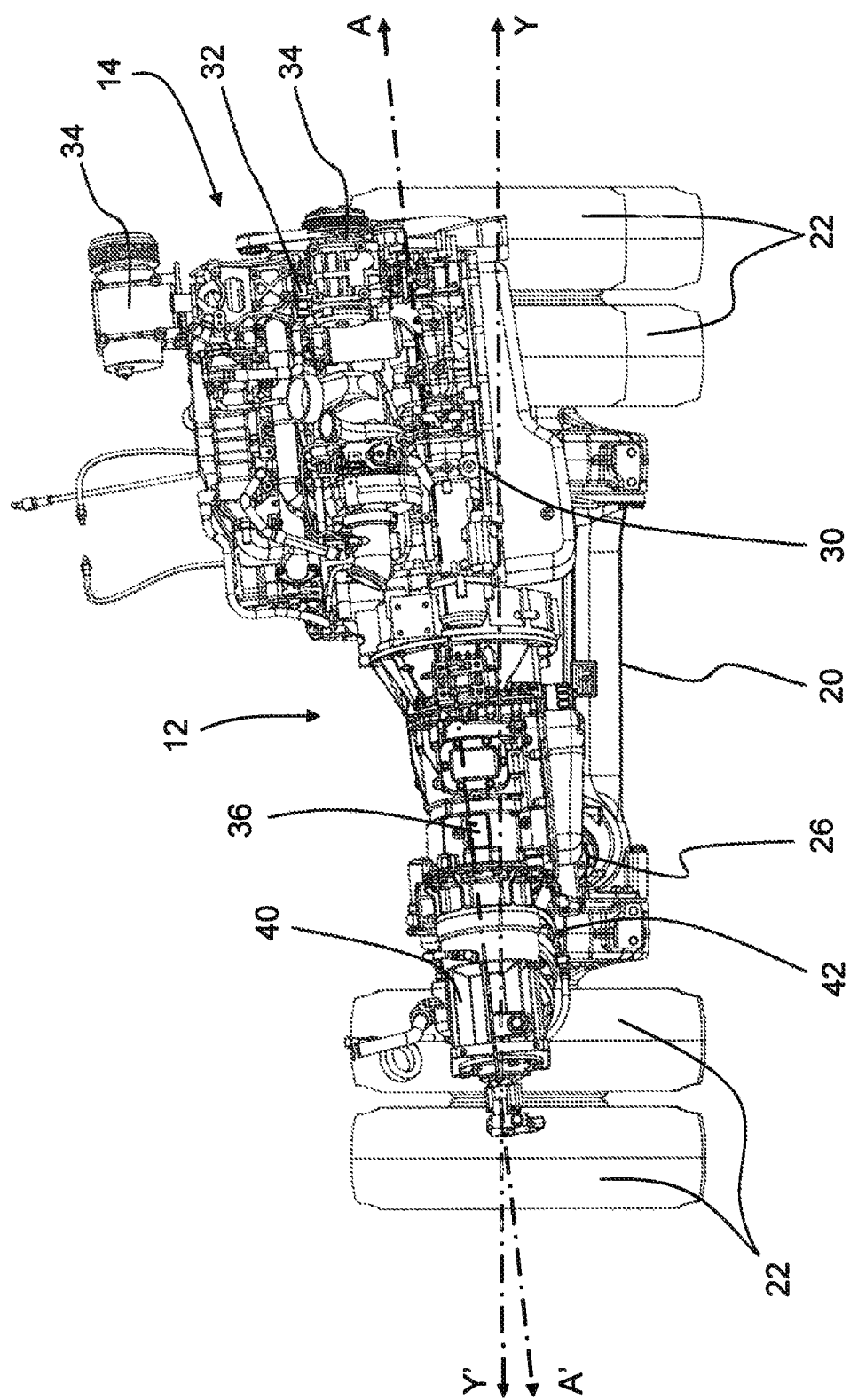
FIG. 3 is a rear view of the drive train assembly of FIG. 2.

Referring now to FIG. 3, drive train assembly 12 is shown from a rear perspective in which reference plane YZ is parallel to the page. As shown, in some embodiments, drive train assembly 12 may be disposed within vehicle 10 so that the propulsion unit axis A-A' is also offset relative to the horizontal vehicle plane XY, such that angle gearbox 40 is closer to the vertical height of the input shaft 26 of the driven axle 20 than is the engine 30, which is comparatively at a higher elevation within vehicle 10. This orientation reduces or minimizes the offset with reference to the Z-Z' axis between the output shaft 42 and the input shaft 26 and, similar to the angular offset of propulsion unit axis A-A' with respect to reference plane YZ, allows for an increase in the length of propulsion unit 14 that may be accommodated within vehicle 10.

The vertical angular deviation between reference plane XY and propulsion unit axis A-A' can be varied in different embodiments. In some cases, the angular offset may be any angle between 3 and 7 degrees, without departing from the scope of the described embodiments. For example, in some cases the angle can be 5 degrees approximately although other angles may be used as well. In some embodiments, the angular deviation between plane YZ and axis A-A' may be minimized for a given configuration of components in drive train assembly 12.

Referring again to FIG. 2, in some embodiments, the input shaft 26 of differential gear set 24 on driven axle 20 may generally be aligned along an input shaft axis C-C'. The differential gear set 24 and angle bevel gear box 40 can be coupled to propeller shaft 50 so that output shaft axis B-B' and the input shaft axis C-C' are not nonparallel with one another. For example, in some embodiments, one or more constant velocity joints 52 coupled to propeller shaft 50 can be utilized to achieve angular offset between output shaft axis B-B' and the input shaft axis C-C'.

In some embodiments, differential gear set 24 and angle bevel gear box 40 can be arranged so that the intersection of output shaft axis B-B' and the input shaft axis C-C' can be roughly aligned with the midpoint of propeller shaft 50. That is, plane BZ formed by the reference of output shaft axis B-B' and vertical axis Z-Z' may intersect with the plane CZ formed by the reference of input shaft axis C-C' and vertical axis Z-Z' in a line located approximately equidistant from output shaft 42 and input shaft 26. In such cases, the angle bcz formed between the planes BZ and CZ will be the summation of angles imposed upon both constant velocity joints 52 in the horizontal plane XY and can vary based on the configuration of constant velocity joints 52 and the relative amount of angular deviation that each constant velocity joint 52 provides.

Figure 4:
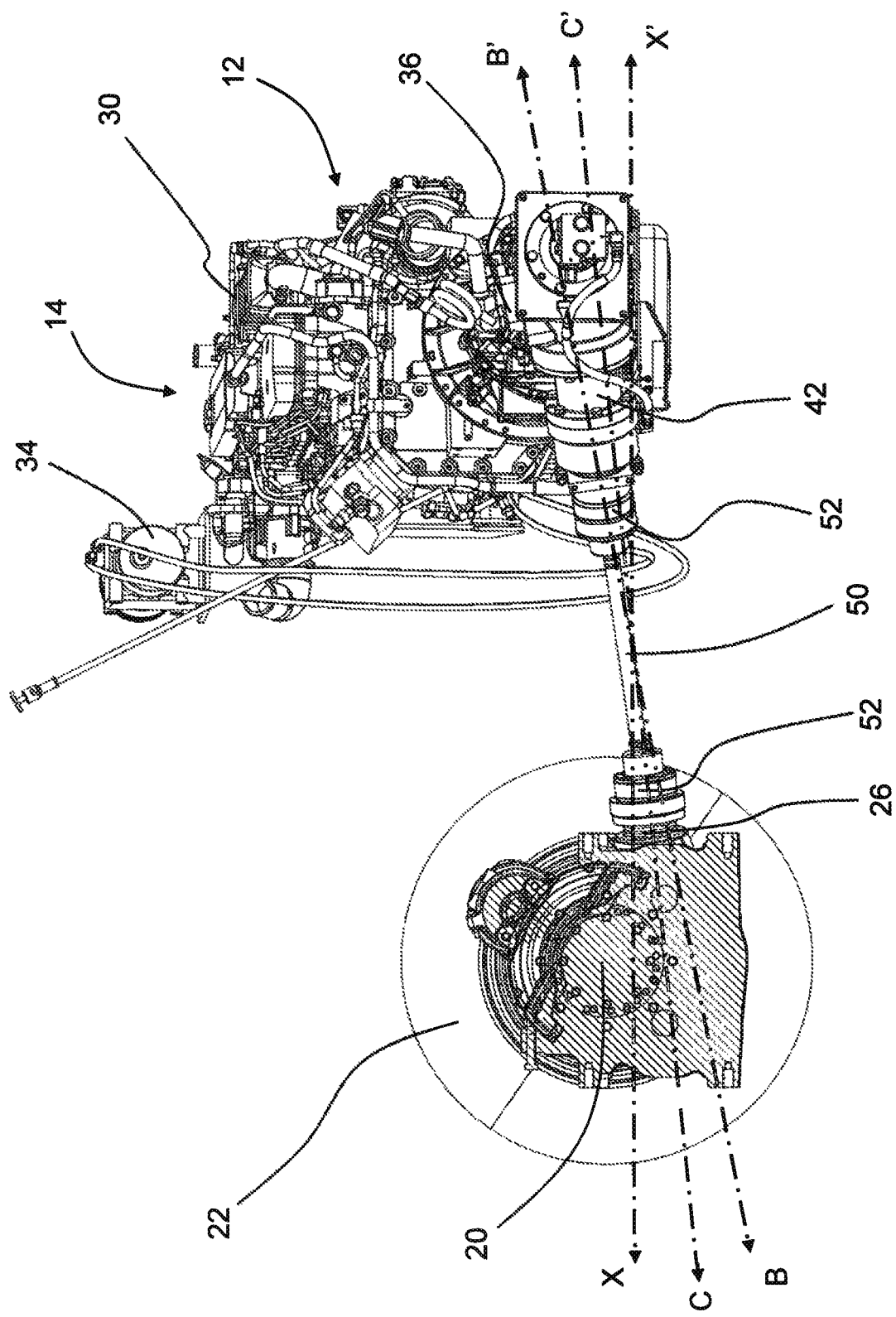
FIG. 4 is a side view of the drive train assembly of FIG. 2.

Now referring to FIG. 4, drive train assembly 12 is shown from a side perspective in which reference plane XZ is parallel to the page. As shown, in some embodiments, neither the output shaft axis B-B' nor the input shaft axis C-C' are parallel to the horizontal vehicle plane XY, but rather are oriented so that propeller shaft 50 has a downward tractor in the direction of driven axle 20. In addition, output shaft axis B-B' can be oriented so that the output shaft 42 is closer vertically to the height of the input shaft 26 of the driven axle 20 than is the engine 30. This orientation may further reduce or minimize angular deviation between the output shaft axis B-B' and the input shaft axis C-C' by compressing the vertical separation within drive train assembly 12 between output shaft 42 and input shaft 26.

In some embodiments, a plane BY formed by the reference of output shaft axis B-B' and transverse axis Y-Y' may be uniquely parallel to the plane CY formed by the reference of input shaft axis C-C' and transverse axis Y-Y'. The plane BY and the plane CY may intersect in a single line, forming the angle bcy, which is the summation of angles imposed upon both constant velocity joints 52 in the vertical plane XZ. In some embodiments, the intersection of the plane BY and the plane CY may be located between output shaft 42 and input shaft 26. In other embodiments, the intersection of the plane BY and the plane CY may be a greater relative distance away from output shaft 42 and input shaft 26, as the plane BY and the plane CY approach a parallel state. In some embodiments, the nonparallel angular deviation between plane BY and plane CY may be minimized for a given configuration of components in drive train assembly 12. For example, in some embodiments, plane BY and plane CY may approach a minimum angular deviation.

Figure 5:
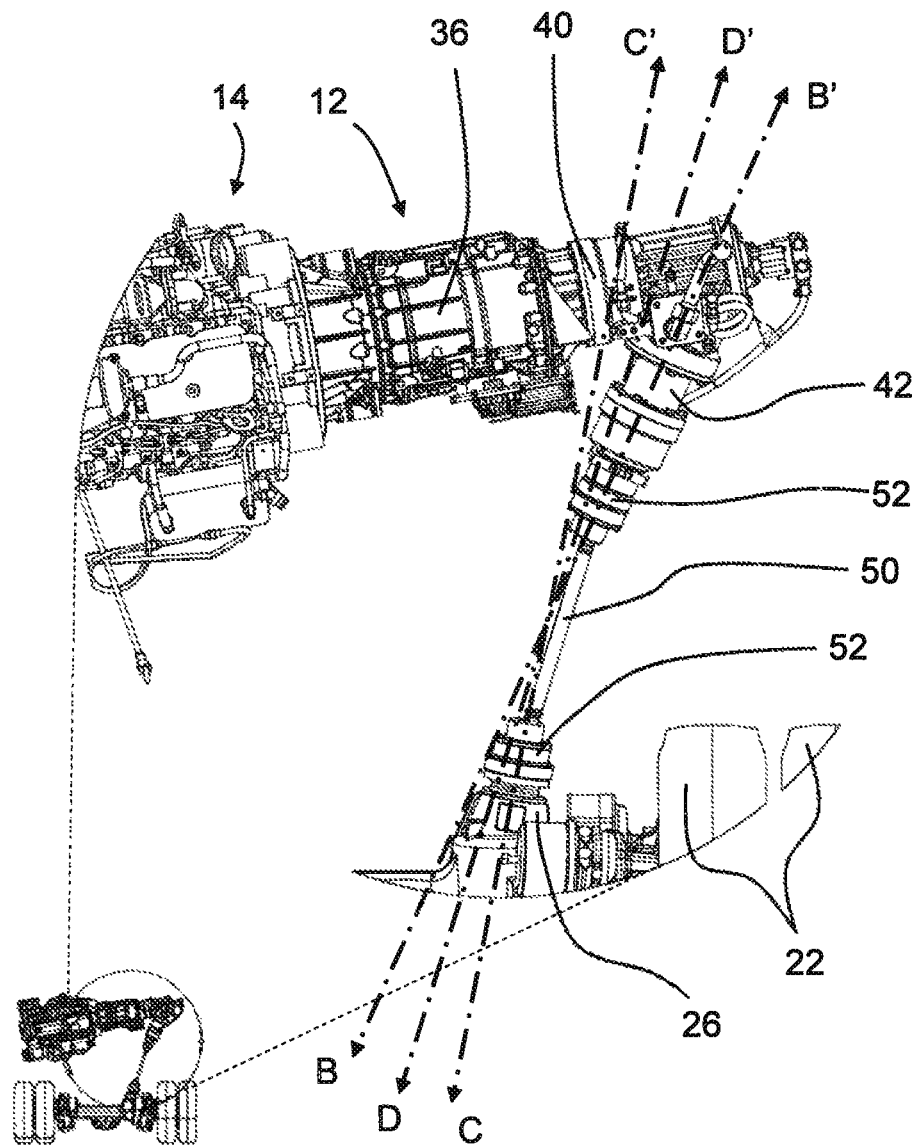
FIG. 5 is a partial orthographic view of the drive train assembly of FIG. 2

Referring now to FIG. 5, the relationship between the output shaft axis B-B' and the input shaft axis C-C' is shown is further detail. FIG. 5 further depicts an axis D-D' along the length of the propeller shaft 50. The angle bc between the axis B-B' and C-C' may be calculated by the summation of the angles of the angles bcz and bcy. In some embodiments, the output shaft axis B-B' and the input shaft axis C-C' converge at a point equidistant from each other, forming the angle bc. For example, in some embodiments, the angle bd formed between the output shaft axis B-B' and the propeller shaft axis D-D' is approximately equal to the angle cd formed between the input shaft axis C-C' and the propeller shaft axis D-D'. In this way, in some embodiments, the angular deviation experienced at each constant velocity joint 52 is approximately equal and is measured as approximately one half of the total angle bc. In some embodiments, the angular deviation can be up to approximately 8 degrees at each constant velocity joint 52 for a total of up to approximately 16 degrees between output shaft axis B-B' and the input shaft axis C-C'

As described herein, features of various embodiments of the invention provide distinct advantages over previous implementations of an angled power train assembly. In prior implementations, a parallel or nearly parallel orientation of the axes of the input and output shaft would result from the use of universal joints to provide interconnections to the propeller shaft. A universal joint has relatively limited allowable angular deflection, however, and generally requires effectively coaxial alignment of the input and output shafts, as well as a propeller shaft of sufficient length that excitement of the axle in the vertical plane relative to the vehicle would not cause the transient angular deflection of the universal joints to exceed 2 or 3 degrees in any direction. In prior implementations, substantial area and rearward length within the vehicle would be required in order to accommodate a long, straight driveshaft and to have clearance from adjacent components, such as the rear wheels.

In embodiments of the present invention, the use of constant velocity joints 52 to provide interconnections on each end of propeller shaft 50 advantageously allows greater angular deviation between the output shaft axis B-B' and the input shaft axis C-C'. Angled gear box 40, propeller shaft 50, and axle differential 24 may thereby be more compactly designed to transmit power and torque to the rear wheels 22 than configurations based around universal joints. An additional advantage is that the length of the propeller shaft 50 may be reduced compared to other arrangements without detrimental effect due to transient angular deviations. An additional advantage is that the use of additional propeller shafts, direction changing gearboxes, and supporting bearings or other joints may be avoided in the described embodiments, which can reduce component costs, weight, complexity, required maintenance and potential failure points in the system over other implementations.

Thus, in some embodiments, the propeller shaft 50 and the constant velocity joints 52 are capable of relatively high angular deflection and of generally continuous operation at substantial angles without detrimental effect on performance or wear. For example, in some cases, the up to 8 degrees of angular deviation that can be provided by each constant velocity joint 52 exceeds that 2 or 3 degrees in any direction of angular deviation that a universal joint can undergo.

The above description is intended to provide a thorough description of various aspects and example embodiments of one or more inventions. Accordingly, various aspects and/or components of such invention(s) have been described throughout at multiple different levels of abstraction. In some instances, embodiments may have been described on both a specific and a relatively general or generic level, for example, where an aspect or component of the embodiment is susceptible to variation in a manner that is not inconsistent with the specific structure(s) and/or operation(s) set forth. In these instances, the specific embodiments set forth herein may not be the only ones contemplated and instead may only be exemplary of a more general or generic configuration. The scope of the invention(s) described herein is therefore defined solely by the language of the claims appended hereto, giving due consideration to applicable doctrines for construing their meaning.

The invention claimed is:

1. A power train assembly for a passenger bus having a rear driven axle and a propulsion unit positioned rearward of the rear driven axle, the drive train assembly comprising:
    a propulsion unit positioned rearward of the wheels of the rear driven axle of the passenger bus;
    a transmission aligned with an axis along which the propulsion unit is oriented; and
    an angled bevel gear box coupled to the transmission, the angled bevel gear box having an output shaft aligned with an output shaft axis that is angularly offset from each of a longitudinal axis of the vehicle and the axis of the propulsion unit;
    wherein
        the axis of the propulsion unit is oriented so that it is generally aligned transverse to the longitudinal axis of the vehicle and forms a first angle with a plane defined by transverse and vertical axes of the vehicle, and
        the output shaft of the angled bevel gear box and an input shaft of the rear driven axle are connected via a propeller shaft, the propeller shaft comprising at each end a constant velocity joint configured to change the angle of torque transmitted from the angled beveled gear box to the rear driven axle.

2. The assembly of claim 1, wherein the first angle is between 5 and 15 degrees.

3. The assembly of claim 1, wherein the axis of the propulsion unit is oriented so as to form a second angle with a plane defined by the longitudinal and transverse axes of the vehicle.

4. The assembly of claim 3, wherein the second angle is between 3 and 7 degrees.

5. The assembly of claim 1, wherein the output shaft of the angled bevel gear box and the input shaft of the rear driven axle are not parallel.

6. The assembly of claim 5, wherein the output shaft of the angled bevel gear box and the input shaft of the rear driven axle are aligned on respective axes that do not intersect.

7. The assembly claim 6, wherein respective angles of the constant velocity joins are equal.

8. The assembly of claim 7, wherein each constant velocity joint provides up to 8 degrees of angular deviation.

9. A passenger bus comprising:
front and rear axles;
a propulsion unit positioned rearward of the wheels of the rear axle; and
a drive train assembly coupled to the propulsion unit and to the rear axle, the drive train assembly comprising:
a transmission aligned with an axis along which the propulsion unit is oriented; and
an angled bevel gear box coupled to the transmission, the angled bevel gear box having an output shaft aligned with an output shaft axis that is angularly offset from each of a longitudinal axis of the vehicle and the axis of the propulsion unit;
wherein
the axis of the propulsion unit is oriented so that it is generally aligned transverse to the longitudinal axis of the vehicle and forms a first angle with a plane defined by transverse and vertical axes of the vehicle, and
the output shaft of the angled bevel gear box and an input shaft of the rear driven axle are connected via a propeller shaft, the propeller shaft comprising at each end a constant velocity joint configured to change the angle of torque transmitted from the angled bevel gear box to the rear driven axle.

10. The passenger bus of claim 9, wherein the first angle is between 5 and 15 degrees.

11. The passenger bus of claim 9, wherein the axis of the propulsion unit is oriented so as to form a second angle with a plane defined by the longitudinal and transverse axes of the vehicle.

12. The passenger bus of claim 11, wherein the second angle is between 3 and 7 degrees.

13. The passenger bus of claim 9, wherein the output shaft of the angled bevel gear box and the input shaft of the rear driven axle are not parallel.

14. The passenger bus of claim 13, wherein the output shaft of the angled bevel gear box and the input shaft of the rear driven axle are aligned on respective axes that do not intersect.

15. The passenger bus of claim 14, wherein respective angles of the constant velocity joints are equal.

16. The passenger bus of claim 15, wherein each constant velocity joint provides up to 8 degrees of angular deviation.

* * * * *